US011348554B1

(12) United States Patent
Tang et al.

(10) Patent No.: US 11,348,554 B1
(45) Date of Patent: May 31, 2022

(54) ELECTRONIC DEVICES HAVING DISPLAYS WITH PERIPHERAL LUMINANCE COMPENSATION

(71) Applicant: Apple Inc., Cupertino, CA (US)

(72) Inventors: Yingying Tang, Mountain View, CA (US); Chaohao Wang, Sunnyvale, CA (US); Wei H. Yao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/002,680

(22) Filed: Aug. 25, 2020

Related U.S. Application Data

(60) Provisional application No. 62/906,609, filed on Sep. 26, 2019.

(51) Int. Cl.
*G09G 5/10* (2006.01)
*G06T 1/20* (2006.01)

(52) U.S. Cl.
CPC ............ *G09G 5/10* (2013.01); *G06T 1/20* (2013.01); *G09G 2310/0232* (2013.01); *G09G 2320/0233* (2013.01); *G09G 2320/0673* (2013.01); *G09G 2370/00* (2013.01); *G09G 2380/02* (2013.01)

(58) Field of Classification Search
CPC ............ G09G 5/10; G09G 2310/0232; G09G 2320/0233; G09G 2320/0626; G09G 2320/0673; G09G 2370/00; G09G 2380/02; G06T 1/20
See application file for complete search history.

(56) References Cited

U.S. PATENT DOCUMENTS

| | | | | |
|---|---|---|---|---|
| 5,757,343 | A * | 5/1998 | Nagakubo | ............... G09G 3/294 345/63 |
| 7,557,777 | B2 * | 7/2009 | Yu | ......................... G09G 3/2803 345/63 |
| 10,482,844 | B2 | 11/2019 | Lin et al. | |
| 2011/0102452 | A1 | 5/2011 | Yun et al. | |
| 2020/0074918 | A1 | 3/2020 | Yang et al. | |
| 2020/0226990 | A1 | 7/2020 | Jun et al. | |

\* cited by examiner

*Primary Examiner* — Antonio A Caschera
(74) *Attorney, Agent, or Firm* — Treyz Law Group, P.C.; G. Victor Treyz; Jason Tsai

(57) ABSTRACT

An electronic device may have a display. A protective display cover layer for the display may tend to dim pixels near the edge of the display. Control circuitry in the electronic device may boost luminance for pixels in an edge region of a displayed image relative to a center region of the image. This ensures that image brightness does not vary across the image. The control circuitry may include a graphics processing unit, a pixel pipeline implemented in a system-on-chip circuit block, and a display drive circuit block. Luminance compensation may be implemented in the system-on-chip block and/or in the display driver circuit block.

20 Claims, 6 Drawing Sheets

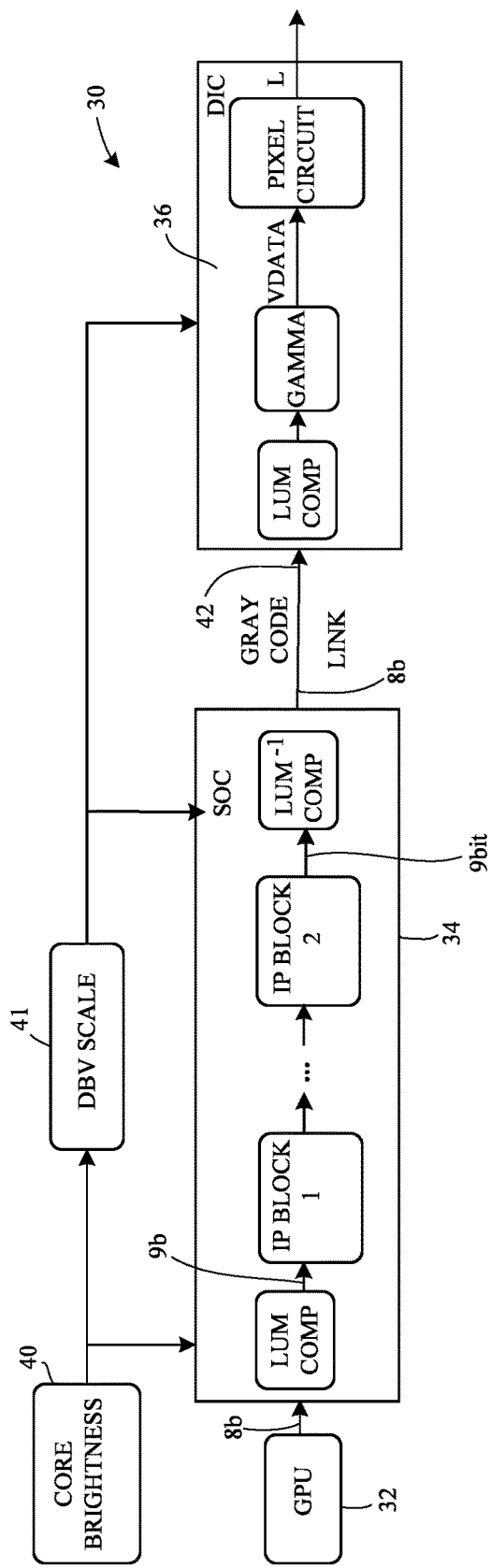
FIG. 6
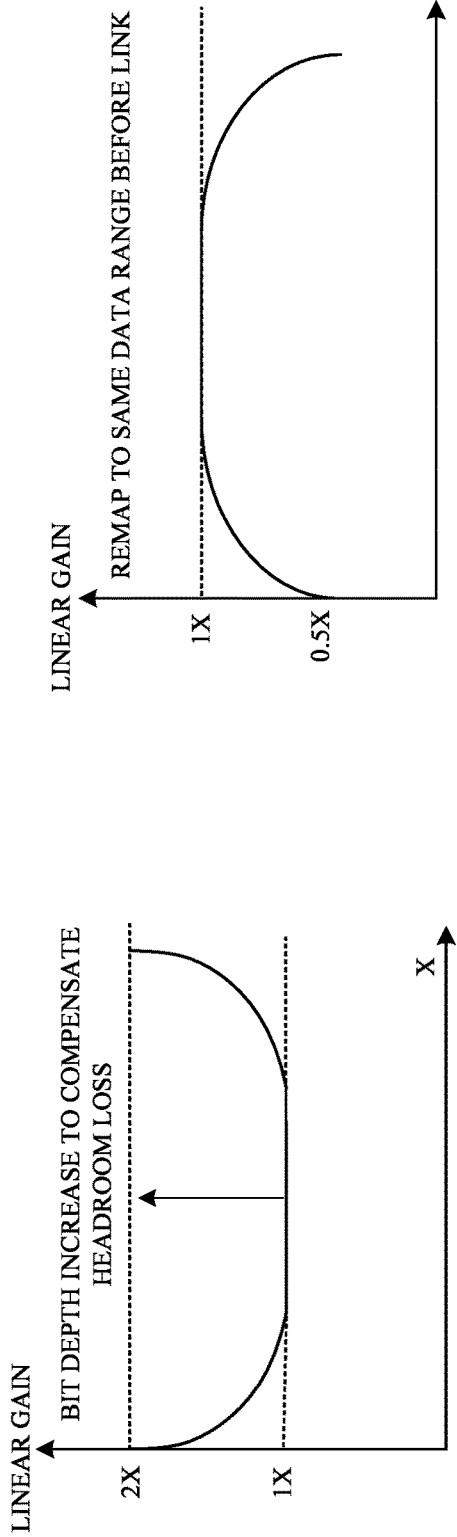
FIG. 7
FIG. 8

ELECTRONIC DEVICES HAVING DISPLAYS WITH PERIPHERAL LUMINANCE COMPENSATION

This application claims the benefit of provisional patent application No. 62/906,609, filed Sep. 26, 2019, which is hereby incorporated by reference herein in its entirety.

FIELD

This relates generally to electronic devices, and, more particularly, to electronic devices with displays.

BACKGROUND

Electronic devices may have displays. Displays have arrays of pixels for displaying images for a user.

It can be challenging to provide a display with satisfactory image quality. If care is not taken, image characteristics may vary across the display, leading to undesired visual artifacts.

SUMMARY

An electronic device may have a display. The display may be covered with transparent protective material forming a display cover layer. Due to factors such as the presence of the display cover layer and the technology used in forming the display cover layer, there is a risk that pixels near the edge of the display may be dimmed relative to pixel in the center of the display. This effect can be avoided by adjusting pixel luminance.

With an illustrative configuration, control circuitry in the electronic device may boost luminance for pixels in an edge region of a displayed image relative to a center region of the image. This ensures that image brightness does not vary undesirably across the image. Rather, edge portions of the image will appear as bright as center portions of the image.

The control circuitry may include a graphics processing unit, a pixel pipeline implemented in a system-on-chip circuit block, and a display drive circuit block. Luminance compensation may be implemented in the system-on-chip block and/or in the display driver circuit block.

BRIEF DESCRIPTION OF THE DRAWINGS

FIGS. 4, 5, and 6 are circuit diagrams of illustrative control circuitry for an electronic device in accordance with an embodiment.

FIGS. 7 and 8 show how the circuit of FIG. 6 may implement peripheral luminance boosting and inverse peripheral luminance adjustments in accordance with an embodiment.

DETAILED DESCRIPTION

An electronic device may have a display. The display may have pixels for creating an image. The image may pass through transparent protective structures. To ensure that the image is satisfactory when viewed by a user, image adjustments may be applied to image data before the image data is loaded into the pixels.

Figure 1:
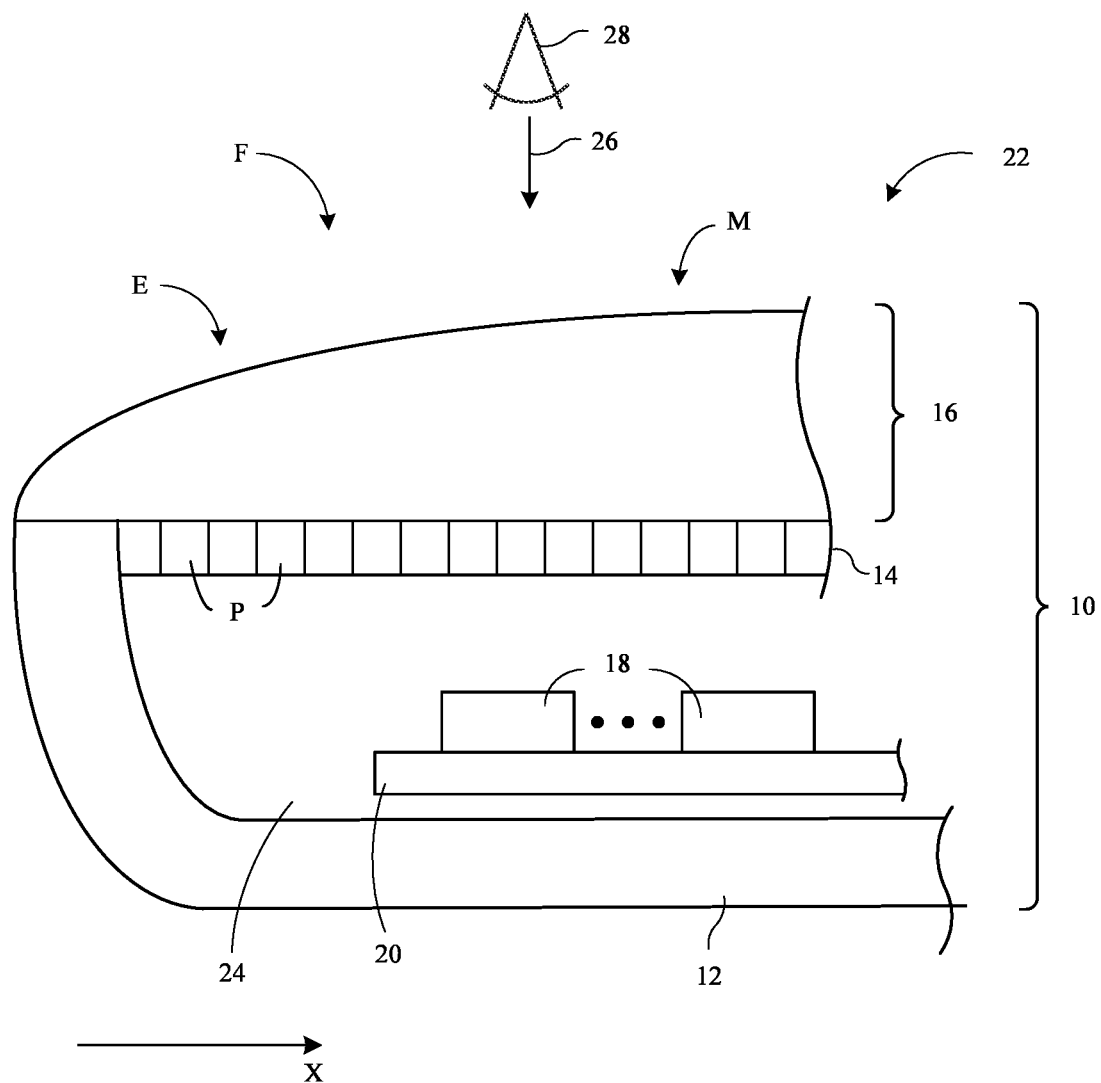
FIG. 1 is a side view an illustrative electronic device in accordance with an embodiment.

A cross-sectional side view of a portion of an illustrative electronic device is shown in FIG. 1. Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may be sufficiently flexible to be bent. Displays for device 10 may have pixel arrays for displaying images for a user. For example, device 14 of FIG. 1 has pixels P.

Display 14 may be overlapped by transparent housing structures such as transparent layer 16 on front face F of device 10. Transparent layer 16 covers and protects display 14 and may sometimes be referred to as a display cover layer or transparent housing layer. Layer 16 may include a protective layer formed from glass, crystalline material such as sapphire, polymer, and/or other transparent material and may be formed using any suitable display cover layer technology.

During operation, pixels P of display 14 produce image light that passes through layer 16 for viewing by a user such as viewer 28 who is viewing device 10 in direction 26. Viewer (user) 28 may, as an example, view display 14 in a straight-on direction that is parallel to the surface normal of a planar central portion M of layer 16 on front face F. Layer 16 may have a rectangular outline or other suitable shapes. In some configurations, the corners of a rectangular layer 16 may be curved. Portions of layer 16 such as portions of layer 16 in peripheral edge region E may exhibit curved cross-sectional profiles. Curved edge portions may be located along the four sides of a rectangular layer 16 and/or at the curved corners of layer 16. In some configurations, layer 16 may have other shapes (e.g., circular outlines, oval outlines, etc.).

Due to the factors such as the geometry and technology used in forming layer 16 (e.g., the orientation of layer 16 relative to pixels P, the material(s) used in forming layer 16, the curvature or planarity of the upper and/or lower surfaces of layer 16, etc.), there may be a luminance drop off for light emitted by pixels P along the edge of device 10 (e.g., the portion of the image in edge region E may be undesirably dimmed relative to the portion of the image in center region M). To ensure that the image viewed by viewer 28 has even luminance across the entire image, the control circuitry of device 10 can selectively increase the luminance of pixel data associated with pixels in edge region E relative to pixels in central region M. This ensures that the image will not appear overly dim in edge region E. If desired, a progressively boosted pixel luminance compensation scheme may be implemented to compensate for a progressively decreasing light transmission at increasing lateral distances through edge E (e.g., so that pixels at the outermost portions of edge E will be boosted more than pixels in the middle of edge E, which, in turn, will be boosted more than pixels at the innermost portion of edge E).

Figure 2:
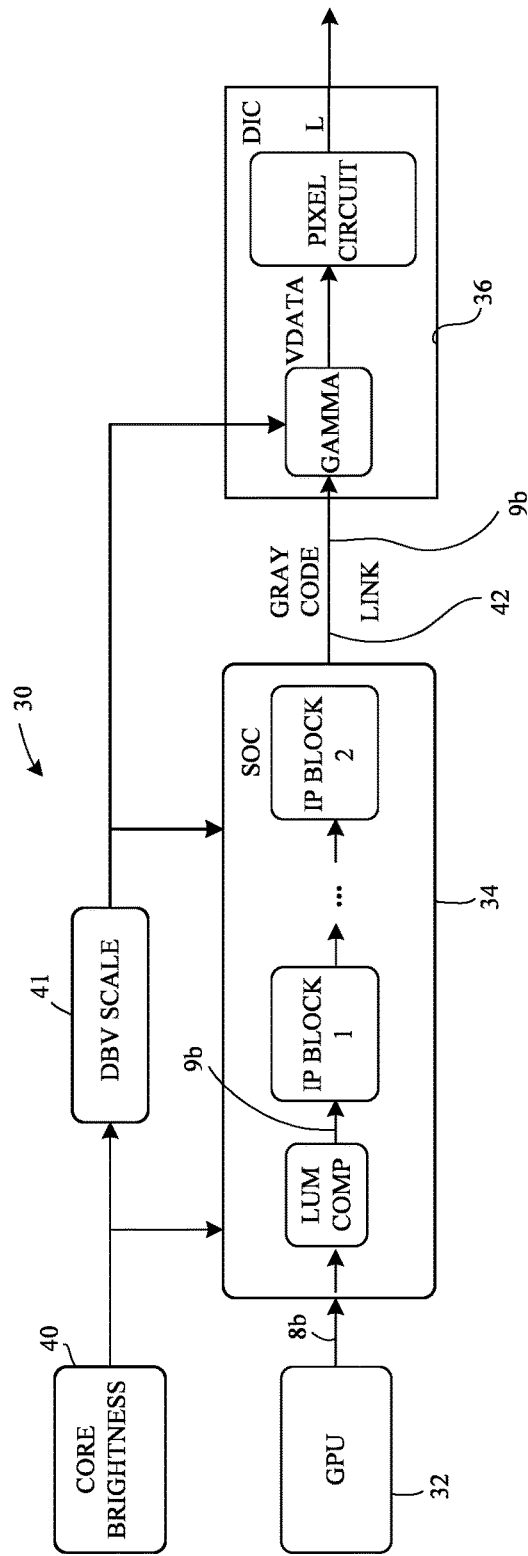
FIG. 2 is a circuit diagram of illustrative control circuitry for an electronic device in accordance with an embodiment.

FIG. 2 shows illustrative control circuitry of the type that may be used in device 10 to boost edge pixel luminance. As shown in FIG. 2, control circuitry 30 may include a graphics processing unit such as graphics processing unit (GPU) 32. GPU 32 may receive image data (e.g., video, still images, etc.) from a system processor and/or other data sources. A frame buffer in GPU 32 may be used to store frames of image data for display 14 before these frames of data are supplied to downstream circuitry for displaying on display 14. In an illustrative configuration, GPU 32 outputs 8-bit image data. Other formats for the image data may be used, if desired. The outputting of image data with an 8-bit bit depth from GPU 32 is sometimes described herein as an example.

A pixel pipeline may receive the image data from GPU 32. The pixel pipeline may be used in performing image processing functions such as implementing dithering schemes, implementing high-dynamic range schemes, etc. In the example of FIG. 2, the pixel pipeline is implemented in a circuit block such as system-on-chip (SOC) circuitry (SOC 34). Other pixel pipeline circuitry may be used, if desired.

As shown in FIG. 2, SOC 34 provides data to downstream circuitry (e.g., the block of circuitry labeled as DIC 36 in FIG. 2). DIC 36 may include pixels P and display driver circuitry implemented using one or more display driver integrated circuits (sometimes referred to as timing controller integrated circuits). The display driver circuitry of DIC 36 and the pixel circuitry ("Pixel Circuit") of DIC 36 receive image data and display the image data on corresponding pixels P of display 14 to create an image for a user such as viewer 28 of FIG. 1. DIC 36 may include gamma curve mapping circuitry such as a gamma block ("Gamma") for implementing a mapping between digital image data (e.g., a digital count value DC for each pixel) and corresponding analog pixel voltages (e.g., voltages Vdata, which are loaded into to the individual pixels of the pixel circuitry of display 14). The gamma functions of gamma block Gamma involve mapping values of DC (e.g., 0-255 or other suitable digital count values) for image pixels to voltages Vdata that are loaded into the pixel circuits of respective pixels P. Block Gamma implements a desired gamma mapping using gamma curves (e.g., gamma curves for red pixels, green pixels, and blue pixels and, in some configurations, gamma curves for different locations on display 14).

In some configurations, device 10 may allow ambient light sensor readings and/or user brightness selections to be used in adjusting pixel brightness (see, e.g., core brightness circuitry 40 and digital brightness value circuitry 41). Circuitry 40 can provide control signals to SOC 34 and/or 36 to make these brightness adjustments.

Figure 3:
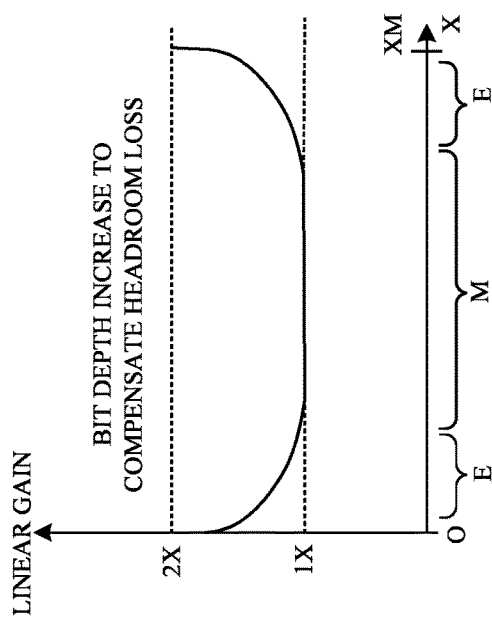
FIG. 3 is an illustrative luminance boost graph in accordance with an embodiment.

The amount of edge pixel luminance boosting to be implemented in a given device depends on the optical characteristics of layer 16 and display 14. In an illustrative configuration, which is sometimes described herein as an example, pixel luminance is boosted by a factor of two at the outermost periphery of edge region E, where luminance is most degraded (in this example). The graph of FIG. 3 plots linear gain for luminance compensation as a function of lateral distance (X) across device 10 from the leftmost device edge (X=0) to the rightmost device edge (X=XM). FIG. 3 shows how linear gain varies from a value of 1× (unitary gain) in center region M to 2× at the outer edge of region E.

To compensate for headroom loss while preserving image quality, the bit depth of the image data may be increased. As shown in FIG. 2, luminance compensation may be implemented at the beginning of the pixel pipeline of SOC 34 (illustrated by the pixel pipeline functions of the SOC pixel pipeline IP blocks (IP Block 1, . . . IP Block 2). Incoming 8-bit data (e.g., an uncompensated 8-bit image frame) is received by luminance compensation block Lum Comp. Using SOC 34, block Lum Comp applies the linear gain function of FIG. 3 (in two lateral dimensions X and Y) to produce a corresponding luminance-compensated 9-bit image frame at the output of block Lum Comp. A look-up table (LUT) may be used in mapping input pixels to compensated output pixels. This 9-bit frame is then processed by downstream pixel pipeline processes, before being provided over a 9-bit communications link (link 42) to DIC 36 to display for the user on pixels P.

Figure 4:
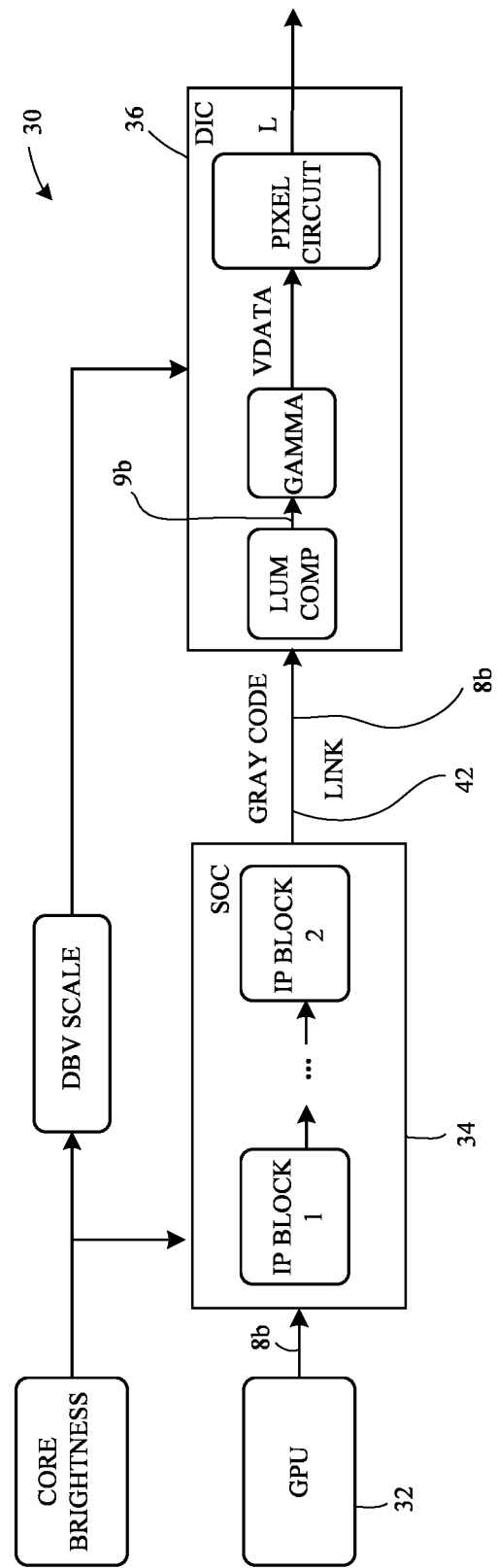

Another illustrative compensation arrangement is shown in FIG. 4. With this arrangement, the mapping operations of luminance compensation block Lum Comp are implemented using the circuitry of DIC 36 before the gamma mapping function of the gamma block (Gamma). As a result, image frames are received by SOC 34 from GPU with an 8-bit bit depth and may be provided from SOC 34 to DIC 36 over link 42 as 8-bit data. It is not necessary (in this arrangement) for link 42 to carry expanded 9-bit data, because the increased headroom for preserving image quality during luminance boosting operations can be used exclusively within IDC 36 (e.g., there is no bit depth loss in SOC 34). Luminance compensation block Lum Comp in DIC 36 may receive data over link 42 with an 8-bit bit depth and may produce corresponding luminance compensated image data characterized by a 9-bit bit depth. The approach of block 36 therefore helps minimize communications link resources. However, the pixel pipeline of SOC 34 will perform its operations without knowledge of the actual (luminance compensated) data values for the pixels, as these values will only be produced after the mapping operations of block Lum Comp in DIC 36 have been performed.

Figure 5:
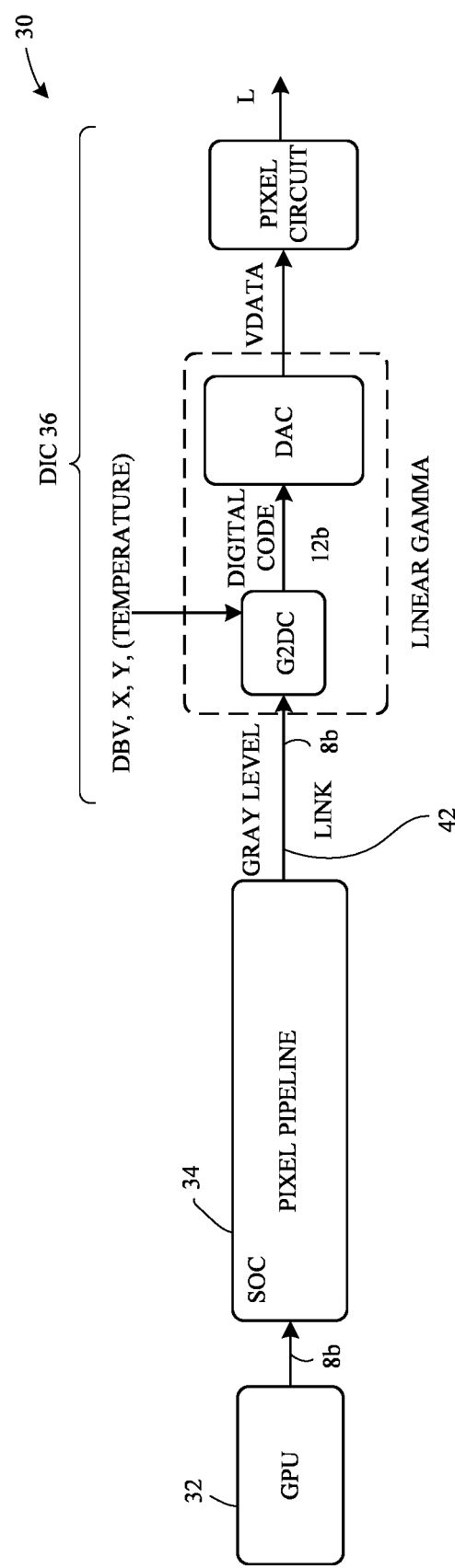

If desired, peripheral pixel luminance compensation may be implemented by boosting the gamma curves for peripheral pixels relative to the gamma curves for central pixels. This approach is shown in the example of FIG. 5. As shown in FIG. 5, DIC 36 has gray-level-to-digital count block G2DC that uses look-up table circuitry to supply 12-bit digital codes to digital-to-analog converter DAC while implementing different gamma curve functions for pixels in different locations of the image (and, if desired different operating temperatures and brightness settings DBV). With this arrangement, DIC 36 converts 8-bit image frame data from SOC 34 to voltages Vdata for pixels P (circuitry block Pixel Circuit). Data link 42 need only support 8-bit data (in this example). The gamma curves implemented by block G2DC may vary as a function of lateral position (X, Y) in the array of pixels forming display 14. For example, the gamma curves may continuously varying as a function of distance through the pixels of edge region E (e.g., to progressively apply more luminance boost as the periphery of display 14 is reached).

In the illustrative configuration of FIG. 6, SOC 36 implements a first luminance compensation operation using the two-dimensional luminance mapping capability of block Lum Comp in SOC 34, which receives 8-bit data from GPU 32 and supplies 9-bit data to the pixel pipeline (blocks IP Block 1 . . . IP Block 2). The output of the pixel pipeline in this arrangement is 9-bit image data, which is mapped back to 8-bit data by inverse luminance compensation block Lum$^{-1}$ Comp. With this arrangement, the pixel pipeline is able to process image data at the enhanced bit depth of 9 bits, thereby helping to enhance pixel pipeline operations. At the same time, block Lum$^{-1}$ Comp is used to remap the image data received at the output of the pixel pipeline back to the original bit depth of the image frames received from GPU 32 (e.g., 8-bit in this example). Because the bit depth is increased during the luminance compensation operation at the beginning of the pixel pipeline, pixel pipeline circuitry is able to have knowledge of the compensated pixel values and because bit depth is decreased back to its original level before the image data at the output of the pixel pipeline is provided to DIC 36 over data line 42, data link 42 need only support the original image data bit depth (e.g., 8-bit data in this example). The desired amount of peripheral luminance compensation for the final image on display 14 can be implemented by including an additional luminance compensation block Lum Comp (e.g., the same two-dimensional luminance map used by block Lum Comp in SOC 34) at the input of DIC 36 after link 42. The luminance mapping operations of the blocks Lum Comp of FIG. 5 are illustrated by the graph of FIG. 7. The corresponding inverse luminance mapping operations of inverse luminance compensation block Lum$^{-1}$ Comp (e.g., equal and opposite linear gain values for performing equal and opposite luminance adjustments) are illustrated by the graph of FIG. 8.

Figure 9:
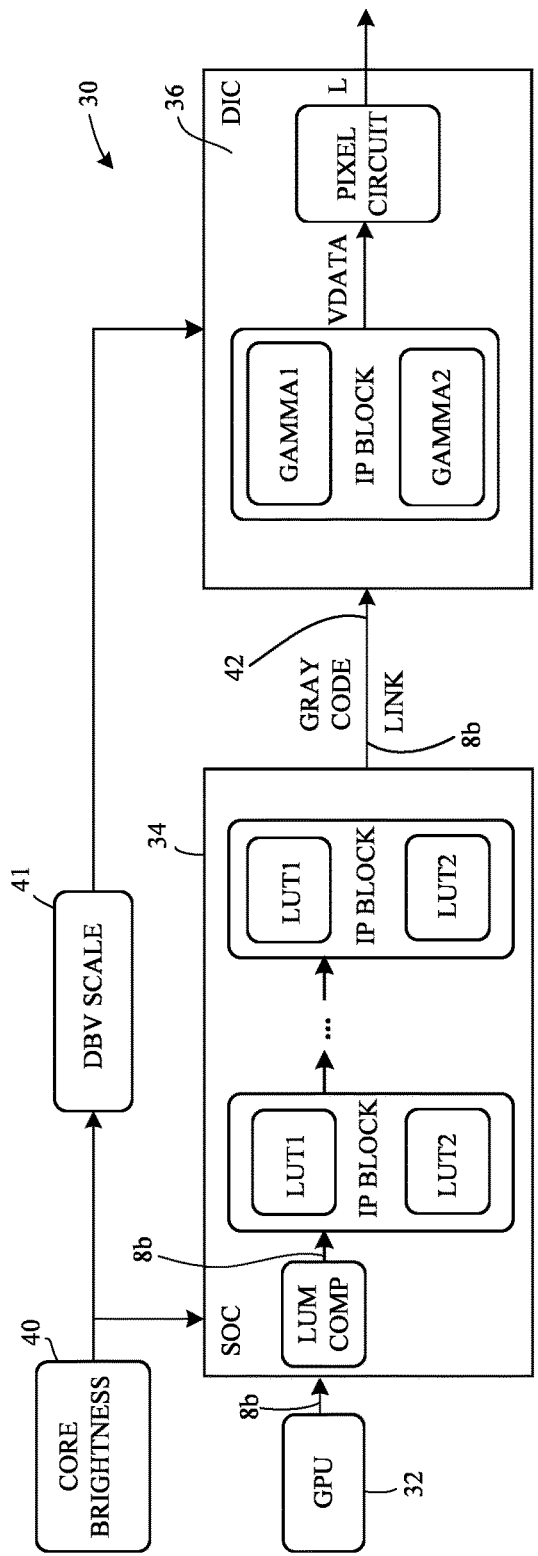
FIG. 9 is a circuit diagram of illustrative control circuitry for an electronic device in accordance with an embodiment.

In the illustrative configuration of FIG. 9, two different gamma curves are used in converting image pixel digital counts (DC) to Vdata. A first gamma curve is used for the pixels of center region M and is implemented using block Gamma 1. A second gamma curve is used for the peripheral pixels of display 14 (e.g., the pixels of edge region E) and is implemented using block Gamma 2. The pixel pipeline in SOC 34 uses multiple corresponding sets of look-up tables (e.g., LUT1 when processing the pixels of center region M and look-up table circuitry such as LUT2 when processing the pixels of edge region E).

Figure 10:
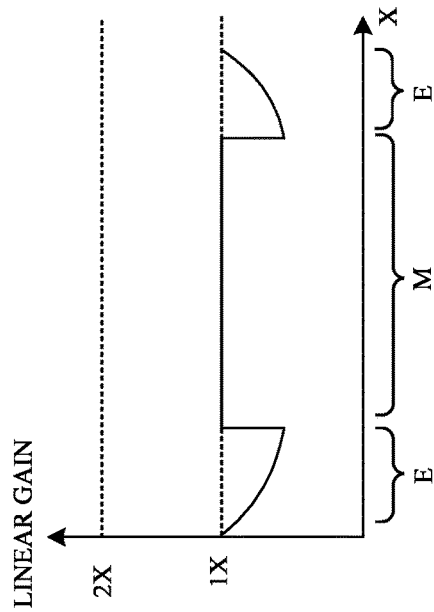
FIG. 10 is an illustrative luminance adjustment graph in accordance with an embodiment.

The luminance mapping performed by block Lum Comp in this type of arrangement is shown in FIG. 10. In region M, no luminance adjustment is made by block Lum Comp. During subsequent pixel pipeline processing, look-up tables LUT1 may be used to process these unadjusted pixels normally. In region E, however, original pixel values are reduced in luminance by block Lum Comp according to the reduced linear gain curve (gain less than 1×) in edge region E of FIG. 10. This reduction in edge pixel luminance is subsequently compensated for using the enhanced gamma of block Gamma 2, thereby producing a desired linear gain of the type shown by FIG. 3. With this arrangement, there is no bit depth increase on data link 42 between SOC 34 and DIC 36 and no bit depth loss in center region M. This is a risk of bit depth loss in edge region E, but this image content in this area is generally less important to viewer 28 than the image content in center region M.

It may be desirable for display 14 to accommodate high dynamic range content. With an illustrative arrangement, the maximum brightness of display 14 is L3 Nits. This maximum brightness may be allocated differently for the pixels in region M and the pixels in region E. In region M, user image data (not including high-dynamic range information) may use a first portion of the maximum brightness range (e.g., L1 Nits-0 Nits) and high-dynamic range functionality may use a second portion of the maximum brightness range (e.g., L2 Nits-L1 Nits, where L2 is less than L3). The pixels in edge region E may use the full display capabilities (L3 Nits-0 Nits). In particular, edge pixels in region E may be allocated L1-0 Nits for user image data, L2'-L1 Nits for luminance compensation (where L2' is sufficient to accommodate, for example, a 2× luminance compensation gain), and L3-L2' Nits for high dynamic range.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device, comprising:
   a graphics processing unit configured to provide image data corresponding to an image having a center region and an edge region;
   pixel circuitry configured to display the image;
   a first circuit block that includes a pixel pipeline, wherein the first circuit block is configured to receive the image data from the graphics processing unit;
   a second circuit block that implements a gamma curve mapping and supplies pixel voltages to the pixel circuitry, wherein the first circuit block includes a luminance compensation block that is configured to boost luminance of pixels in the edge region relative to the center region before the pixel pipeline and includes an inverse luminance compensation block that is configured to reduce luminance of pixels in the edge region relative to the center region after the pixel pipeline; and
   a data link between the first circuit block and the second circuit block.

2. The electronic device defined in claim 1 wherein the luminance compensation block is configured to receive the image data at a first bit depth and is configured to output image data to the pixel pipeline at a second bit depth that is greater than the first bit depth.

3. The electronic device defined in claim 2 wherein the inverse luminance compensation block is configured to receive the image data after the pixel pipeline at the second bit depth and is configured to output image data to the data link at the first bit depth.

4. The electronic device defined in claim 3 wherein the second circuit block comprises an additional luminance compensation block that is configured to boost luminance of pixels in the edge region relative to the center region.

5. The electronic device defined in claim 4 wherein the additional luminance compensation block is configured to receive the image data from the data link at the first bit depth and is configured to output image data at the second bit depth.

6. The electronic device defined in claim 5 further comprising a housing and a transparent layer covering the pixel circuitry, wherein light from the pixel circuitry is transmitted through the transparent layer in an on-axis direction that is parallel to a surface normal of the transparent layer overlapping the center region.

7. The electronic device of claim 6 wherein the transparent layer is configured to reduce light transmission in the on-axis direction from pixels in the edge region relative to pixels in the center region.

8. An electronic device, comprising:
pixel circuitry configured to display an image having a center region and an edge region;
a first circuit block having a luminance compensation block configured to boost luminance of pixels in the edge region relative to the center region and having an inverse luminance compensation block configured to reduce luminance of pixels in the edge region relative to the center region, wherein the luminance compensation block is configured to receive image data corresponding to the image at a first bit depth and is configured to output the image data at a second bit depth that is different than the first bit depth; and
a second circuit block configured to receive signals from the first circuit block, to implement a gamma curve mapping, and to supply pixel voltages to the pixel circuitry.

9. The electronic device of claim 8, wherein the second bit depth is greater than the first bit depth.

10. The electronic device of claim 8, further comprising a graphics processing unit configured to provide the image data to the first circuit block.

11. The electronic device of claim 8, wherein the first circuit block further comprises a pixel pipeline interposed between the luminance compensation block and the inverse luminance compensation block.

12. The electronic device of claim 8, wherein the inverse luminance compensation block is configured to receive the image data at the second bit depth and is configured to output image data at the first bit depth.

13. The electronic device of claim 12, wherein the second bit depth is greater than the first bit depth.

14. The electronic device of claim 8, wherein the second circuit block comprises an additional luminance compensation block configured to boost luminance of pixels in the edge region relative to the center region.

15. The electronic device of claim 14, wherein the additional luminance compensation block is configured to receive the image data from the first circuit block at the first bit depth and is configured to output image data at the second bit depth.

16. The electronic device of claim 15, wherein the second bit depth is greater than the first bit depth.

17. An electronic device, comprising:
pixel circuitry configured to display an image having a center region and an edge region;
a first circuit block having a luminance compensation block configured to boost luminance of pixels in the edge region relative to the center region and having an inverse luminance compensation block configured to reduce luminance of pixels in the edge region relative to the center region, wherein the inverse luminance compensation block is configured to receive image data corresponding to the image at a second bit depth and is configured to output the image data at a first bit depth that is different than the second bit depth; and
a second circuit block configured to receive signals from the first circuit block, to implement a gamma curve mapping, and to supply pixel voltages to the pixel circuitry.

18. The electronic device of claim 17, wherein the second bit depth is greater than the first bit depth.

19. The electronic device of claim 17, further comprising a graphics processing unit configured to provide the image data to the first circuit block.

20. The electronic device of claim 17, wherein the first circuit block further comprises a pixel pipeline interposed between the luminance compensation block and the inverse luminance compensation block.

* * * * *